(12) United States Patent
Takahashi et al.

(10) Patent No.: US 9,840,429 B2
(45) Date of Patent: Dec. 12, 2017

(54) SCALE INHIBITION METHOD AND GEOTHERMAL POWER GENERATING DEVICE

(75) Inventors: Kuniyuki Takahashi, Tokyo (JP); Yoshitaka Kawahara, Kanagawa (JP)

(73) Assignee: FUJI ELECTRIC CO., LTD, Kanagawa (JP)

( * ) Notice: Subject to any disclaimer, the term of this patent is extended or adjusted under 35 U.S.C. 154(b) by 504 days.

(21) Appl. No.: 14/009,296

(22) PCT Filed: Mar. 5, 2012

(86) PCT No.: PCT/JP2012/055545
§ 371 (c)(1),
(2), (4) Date: Dec. 2, 2013

(87) PCT Pub. No.: WO2012/144277
PCT Pub. Date: Oct. 26, 2012

(65) Prior Publication Data
US 2014/0083949 A1 Mar. 27, 2014

(30) Foreign Application Priority Data

Apr. 19, 2011 (JP) .................................. 2011-092758

(51) Int. Cl.
*C02F 5/08* (2006.01)
*C02F 1/20* (2006.01)
(Continued)

(52) U.S. Cl.
CPC ................ *C02F 5/08* (2013.01); *C02F 1/008* (2013.01); *C02F 1/20* (2013.01); *C09K 8/528* (2013.01);
(Continued)

(58) Field of Classification Search
None
See application file for complete search history.

(56) References Cited

U.S. PATENT DOCUMENTS

| 5,656,172 A | * | 8/1997 | Kitz | .......................... C02F 1/66 166/310 |
| 5,665,242 A | | 9/1997 | Gallup | |

(Continued)

FOREIGN PATENT DOCUMENTS

| JP | 57-112697 | 7/1982 |
| JP | 61-220793 | 10/1986 |

(Continued)

OTHER PUBLICATIONS

International Search Report (ISR) dated Apr. 24, 2012 (and English translation thereof) issued in International Application No. PCT/JP2012/055545.

*Primary Examiner* — Clare M Perrin
(74) *Attorney, Agent, or Firm* — Holtz, Holtz & Volek PC

(57) ABSTRACT

A method for inhibiting scale including inorganic cations, and an economically operable geothermal power generating device which can inhibit deposition of scale. The geothermal power generating device includes: an inorganic cation concentration measuring device for measuring the concentration of bivalent or more inorganic cations in geothermal water collected from a production well; a flowmeter for measuring the flow rate of the geothermal water collected from the production well; a heat removal unit for lowering the temperature of the geothermal water; a thermometer for measuring the temperature of the geothermal water after removing heat; a pH measuring device for measuring the pH of the geothermal water after removing heat; a calculation processing unit for calculating the additive amount of a scale inhibitor; and a control unit for adding the scale inhibitor to the geothermal water by the amount calculated by the calculation processing unit.

5 Claims, 6 Drawing Sheets

(51) Int. Cl.

| | | |
|---|---|---|
| *C02F 1/68* | (2006.01) | |
| *C02F 1/00* | (2006.01) | |
| *C09K 8/528* | (2006.01) | |
| *E21B 37/06* | (2006.01) | |
| *F03G 7/04* | (2006.01) | |
| *F01K 27/00* | (2006.01) | |
| *F01K 23/00* | (2006.01) | |
| *F28F 19/00* | (2006.01) | |
| *C02F 5/02* | (2006.01) | |
| *C02F 1/66* | (2006.01) | |
| *C02F 5/10* | (2006.01) | |
| *C02F 5/12* | (2006.01) | |
| *C02F 5/14* | (2006.01) | |
| *F24J 3/08* | (2006.01) | |

(52) U.S. Cl.
CPC .............. *E21B 37/06* (2013.01); *F01K 23/00* (2013.01); *F01K 27/00* (2013.01); *F03G 7/04* (2013.01); *F28F 19/00* (2013.01); *C02F 1/66* (2013.01); *C02F 5/083* (2013.01); *C02F 5/10* (2013.01); *C02F 5/12* (2013.01); *C02F 5/14* (2013.01); *C02F 2209/001* (2013.01); *C02F 2209/02* (2013.01); *C02F 2209/06* (2013.01); *C02F 2209/40* (2013.01); *C02F 2303/10* (2013.01); *C02F 2303/22* (2013.01); *F24J 3/08* (2013.01); *Y02E 10/10* (2013.01); *Y02W 10/30* (2015.05)

(56) References Cited

U.S. PATENT DOCUMENTS

| | | | |
|---|---|---|---|
| 6,761,865 B1 * | 7/2004 | Gallup | C01B 33/22 210/696 |
| 2006/0194700 A1 * | 8/2006 | Gatlin | C09K 8/22 507/140 |
| 2010/0300684 A1 * | 12/2010 | Kotsonis | E21B 37/06 166/250.05 |

FOREIGN PATENT DOCUMENTS

| | | |
|---|---|---|
| JP | 62-74499 | 4/1987 |
| JP | 62-111095 | 5/1987 |
| JP | 04-48998 | 2/1992 |
| JP | 04-281899 | 10/1992 |
| JP | 05-195684 | 8/1993 |
| JP | 06-304595 | 11/1994 |
| JP | 09-206733 | 8/1997 |

* cited by examiner

SCALE INHIBITION METHOD AND GEOTHERMAL POWER GENERATING DEVICE

TECHNICAL FIELD

The present invention relates to a method for inhibiting scale containing calcium and other inorganic cations, and a geothermal power generation device in which precipitation of the scale is inhibited and power is generated using geothermal water.

BACKGROUND ART

In geothermal power generation, high-temperature geothermal water is collected from a production well and steam is separated from the geothermal water to produce power. The geothermal water from which steam has been separated is returned into the ground from an injection well.

Geothermal water collected from a production well contains more calcium and other inorganic cations, and dissolved silica than does well water and river water.

The geothermal water collected from a production well is at a high temperature. The temperature of the geothermal water is reduced in a flashing step for extracting steam from the geothermal water by decompression, and inorganic cations and dissolved silica are concentrated. The geothermal water is gradually cooled as it is distributed through the piping in the power generation plant, and solubility of the inorganic cations and dissolved silica is reduced. When the silica contained in the geothermal water enters a supersaturated state, it polymerizes to form amorphous silica, which then precipitates out as silica scale. The inorganic cations form carbonates or other salts and precipitate out. This scale is deposited on the inner wall of piping and the like of the power generation device, and the piping is liable to be blocked or otherwise obstructed.

Conventionally, the acid is added to the geothermal water to reduce the pH and inhibit the precipitation of silica scale, as described in, e.g., patent document 1. The polymerization rate of silica is slowed as the pH is reduced, and reducing the pH of geothermal water therefore reduces the polymerization rate of silica and makes the precipitation of silica scale less likely to occur in the piping of a geothermal power generation device.

A chemical solution has conventionally been injected into the production well to inhibit precipitation of calcium carbonate, anhydrites, magnesium silicate, and other salts of inorganic cations in the production well, as described in patent document 2.

PRIOR ART DOCUMENTS

Patent Documents

[Patent Document 1] Japanese Laid-Open Patent Application No. 6-304595
[Patent Document 2] Japanese Laid-Open Patent Application No. 5-195684

DISCLOSURE OF THE INVENTION

Problems to be Solved by the Invention

Since it is merely that the polymerization rate of silica is reduced when the pH of geothermal water is reduced, the precipitation of silica scale is not always sufficiently reduced in the case that time is required when the geothermal water is returned to the injection well. Also, piping and the like are susceptible to acid-induced corrosion. Furthermore, scale composed of anhydrites and the like are liable to precipitate out in the case that sulfuric acid is used as the acid.

On the other hand, the solubility of amorphous silica increases in commensurate fashion with alkalinity, and the increase is particularly rapid at a pH of 8 or higher. Accordingly, increasing the pH of geothermal water can inhibit the precipitation of silica scale.

However, silica and inorganic cations form salts and precipitate out as scale as the pH of the geothermal water becomes more alkaline.

In contrast, injecting a chemical solution for preventing scale into the production well to remove inorganic cations contained in the geothermal water makes it possible to inhibit precipitation of salts of silica and inorganic cations, as described in patent document 2, but geothermal water contains large quantities of inorganic cations, so costs are increased and it is difficult to operate a geothermal power plant in an economical manner if an attempt is made to remove all inorganic cations in the geothermal water.

Therefore, an object of the present invention is to provide a method for inhibiting scale containing calcium and other inorganic cations and a geothermal power generation device that can be operated in an economical manner while precipitation of the scale is inhibited.

Means to Solve the Problems

In order to achieve the above-stated object, the method for inhibiting scale according to the present invention, includes:

a water inflow measurement step for measuring a flow rate and a concentration of bivalent or more inorganic cations in geothermal water collected from a production well;

a heat removal step for removing heat from the geothermal water;

a water outflow measurement step for measuring a temperature and a pH of the geothermal water after the heat removal step;

a scale-inhibiting agent addition amount calculation step for obtaining a saturation concentration of inorganic cations in the geothermal water after the heat removal step on the basis of the temperature and the pH of the geothermal water after the heat removal step, and calculating an addition amount of a scale-inhibiting agent required for inhibiting the precipitation of salts containing the inorganic cations from the flow rate of the geothermal water and a value obtained by subtracting the saturation concentration of inorganic cations in the geothermal water after the heat removal step from the inorganic cation concentration of the geothermal water measured in the water inflow measurement step; and a scale-inhibiting agent addition step for adding the scale-inhibiting agent to the geothermal water collected from the production well, on the basis of the addition amount of scale-inhibiting agent calculated in the scale-inhibiting agent addition amount calculation step.

In accordance with the method for inhibiting scale of the present invention, the flow rate and concentration of bivalent or more inorganic cations in geothermal water collected from a production well are measured, and the temperature and pH of the geothermal water following the heat removal step are measured. The saturation concentration of inorganic cations in the geothermal water after the heat removal step is obtained on the basis of the temperature and pH of the geothermal water after the heat removal step, and the addition amount of scale-inhibiting agent required for inhibiting the precipitation of salts containing the inorganic cations is calculated from a value obtained by subtracting the saturation concentration of inorganic cations in the geothermal water after the heat removal step from the inorganic cation concentration of the geothermal water measured in the water inflow measurement step, and from the flow rate of the geothermal water. A scale-inhibiting agent is added to the geothermal water collected from the production well, on the basis of the addition amount of scale-inhibiting agent thus calculated. A scale-inhibiting agent corresponding to the amount of inorganic cations that is greater than the saturation concentration and precipitates out can thereby be added to the geothermal water after the heat removal step, scale precipitation can be inhibited, and the addition amount of the scale-inhibiting agent can be kept to the minimum required.

In the method for inhibiting scale according to the present invention, it is preferred that: water samples in which the inorganic cation concentration has been gradually increased be produced with the same silica concentration and pH as the geothermal water collected from the production well; the water samples be held for a predetermined length of time at the temperature following the heat removal step, and the inorganic cation concentration in the treated water be measured; and the concentration of the water samples when the inorganic cation concentration in the treated water is initially less than the inorganic cation concentration of the water samples be used as the saturation concentration.

In accordance with this aspect, the inorganic cation concentration in the water samples when the inorganic cation concentration in the treated water is initially less than the inorganic cation concentration of the water samples can be obtained, and it is thereby possible to obtain the saturation concentration at which precipitation of salts containing inorganic cations begins can be obtained. In the case that the silica concentration, pH, and temperature after the heat removal step fluctuate, the saturation concentration is obtained in advance under various conditions in which the silica concentration, pH, and temperature after the heat removal step have been varied, and the saturation concentration of the inorganic cations in the geothermal water after the heat removal step can thereby be obtained on the basis of the temperature and pH of the geothermal water after the heat removal step.

In the method for inhibiting scale according to the present invention, it is preferred that the inorganic cations be one or more species selected from magnesium ions, calcium ions, bivalent iron ions, trivalent iron ions, and aluminum ions. The above-noted inorganic cations all form salts that react with silica under alkaline conditions, that are difficult to dissolve, and that readily precipitate out. Therefore, there is a strong necessity to apply the method of the present invention.

In the method for inhibiting scale according to the present invention, it is preferred that the pH of the geothermal water be adjusted to 9 or higher. The solubility of silica can be increased to inhibit the occurrence of scale by setting the pH of the geothermal water to 9 or higher.

In the method for inhibiting scale according to the present invention, it is preferred that an alkaline agent be added at the same time the scale-inhibiting agent is added to the geothermal water or after the scale-inhibiting agent has been added to the geothermal water to adjust the pH to 9 or higher. An alkaline agent is added at the same time the scale-inhibiting agent is added or after the scale-inhibiting agent has been added to the geothermal water to adjust the pH to 9 or higher, thereby making it possible to prevent precipitation of salts produced by inorganic cations by the addition of the alkaline agent.

In the method for inhibiting scale according to the present invention, it is preferred that the heat removal step include a flashing step for decompressing the geothermal water and extracting steam, and/or a step for recovering heat from the geothermal water to cause a power-generating medium to evaporate. In accordance with this aspect, the heat of geothermal water can be used to produce power.

In the method for inhibiting scale according to the present invention, it is preferred that the geothermal water collected from the production well be separated into gas and liquid, steam obtained after gas-liquid separation be fed to a power generation facility, and the geothermal water after gas-liquid separation be sent to the heat removal step. In accordance with this aspect, heat can furthermore be recovered from the geothermal water after steam has been separated and power can be produced.

The geothermal power generation device according to the present invention, includes:

an inorganic cation concentration measuring device for measuring a concentration of bivalent or more inorganic cations in geothermal water collected from a production well;

a flow rate meter for measuring a flow rate of the geothermal water collected from the production well;

a heat removal unit for reducing the temperature of the geothermal water;

a thermometer for measuring a temperature of the geothermal water after heat has been removed;

a pH measuring device for measuring a pH of the geothermal water after heat has been removed;

a calculation processing unit for obtaining a saturation concentration of inorganic cations in the geothermal water after the temperature has been reduced in the heat removal unit on the basis of the temperature and the pH of the geothermal water after the temperature has been reduced in the heat removal unit, and calculating an addition amount of a scale-inhibiting agent required for inhibiting the precipitation of salts containing the inorganic cations from the flow rate of the geothermal water and a value obtained by subtracting the saturation concentration of inorganic cations in the geothermal water after the temperature has been reduced in the heat removal unit from the inorganic cation concentration of the geothermal water measured by the inorganic cation concentration measuring device; and a controller for adding the scale-inhibiting agent to the geothermal water in the amount calculated by the calculation processing unit.

In accordance with the geothermal power generation device of the present invention, in the calculation processing unit, the saturation concentration of inorganic cations in the geothermal water after the temperature has been reduced in the heat removal unit is obtained on the basis of the temperature measured by the thermometer and the pH measured by the pH measurement device. Next, the amount of inorganic cations predicted to precipitate out without intervention is calculated from the flow rate of the geothermal water and a value obtained by subtracting the saturation concentration from the inorganic cation concentration measured by the inorganic cation concentration measuring device, and the addition amount of a scale-inhibiting agent required to inhibit precipitation of the predicted amount of inorganic cations is calculated. In the controller, the scale-inhibiting agent is added in the amount calculated in the calculation processing unit, whereby the addition amount of the scale-inhibiting agent can be kept to a required minimum while the precipitation of scale is inhibited.

In the geothermal power generation device according to the present invention, it is preferred that a gas-liquid separator be disposed in a stage prior to the heat removal unit, and the geothermal water after gas-liquid separation be introduced to the heat removal unit. In accordance with this aspect, heat can be further recovered using geothermal water from which steam for power generation has been collected.

It is preferred that heat removal unit of the geothermal power generation device according to the present invention be one or more species selected from piping for releasing heat, a flasher for extracting steam from the geothermal water by decompression, and a heat exchanger for imparting heat to a power generation medium to cause the power generation medium to evaporate. In accordance with this aspect, steam can be separated from the geothermal water to produce power using a steam turbine, or a power generation medium can be made to evaporate using the heat of the geothermal water to produce power.

It is preferred that the geothermal power generation device according to the present invention, include: a solution reservoir unit for retaining a water sample; a temperature control unit for adjusting the temperature of the water sample retained in the solution reservoir unit; a pH adjustment unit for adding acid or alkali to the water sample retained in the solution reservoir unit to adjust the pH; a concentration measurement unit for measuring a bivalent or more inorganic cation concentration in the water sample after a predetermined length of time has elapsed; and an inorganic cation saturation concentration measurement device having a solution supply unit for creating a water sample in which the inorganic cation concentration has been gradually increased and which is allowed to flow in sequential fashion into the solution reservoir unit. In accordance with this aspect, the pH and temperature of a water sample can be varied and the saturation concentration of inorganic cations under various pH and temperature conditions can be measured in advance. Therefore, measuring the temperature or pH of the geothermal water makes it possible to obtain the saturation concentration of inorganic cations in the geothermal water.

Advantageous Effects of the Invention

In accordance with the method for inhibiting scale of the present invention, a scale-inhibiting agent is added to geothermal water collected from a production well, on the basis of the addition amount of the scale-inhibiting agent calculated in the scale-inhibiting agent addition amount calculation step, as described above. Therefore, the scale-inhibiting agent can be added in accordance with the amount of inorganic cations that is equal to or greater than the saturation concentration in the geothermal water after the heat removal step and that precipitates out, the precipitation of scale can be inhibited, and the addition amount of scale-inhibiting agent can be kept to a required minimum.

Also, in accordance with the geothermal power generation device of the present invention, the amount of inorganic cations predicted to precipitate out without intervention is calculated in the calculation processing unit and the addition amount of the scale-inhibiting agent required to inhibit precipitation of the predicted amount of inorganic cations is calculated. In the controller, the scale-inhibiting agent is added in the amount calculated in the calculation processing unit, whereby the addition amount of the scale-inhibiting agent can be kept to a required minimum while the precipitation of scale is inhibited, and the power generation device can be economically operated.

BEST MODE FOR CARRYING OUT THE INVENTION

An embodiment of the geothermal power generation device of the present invention will be described with reference to FIG. 1.

Figure 1:
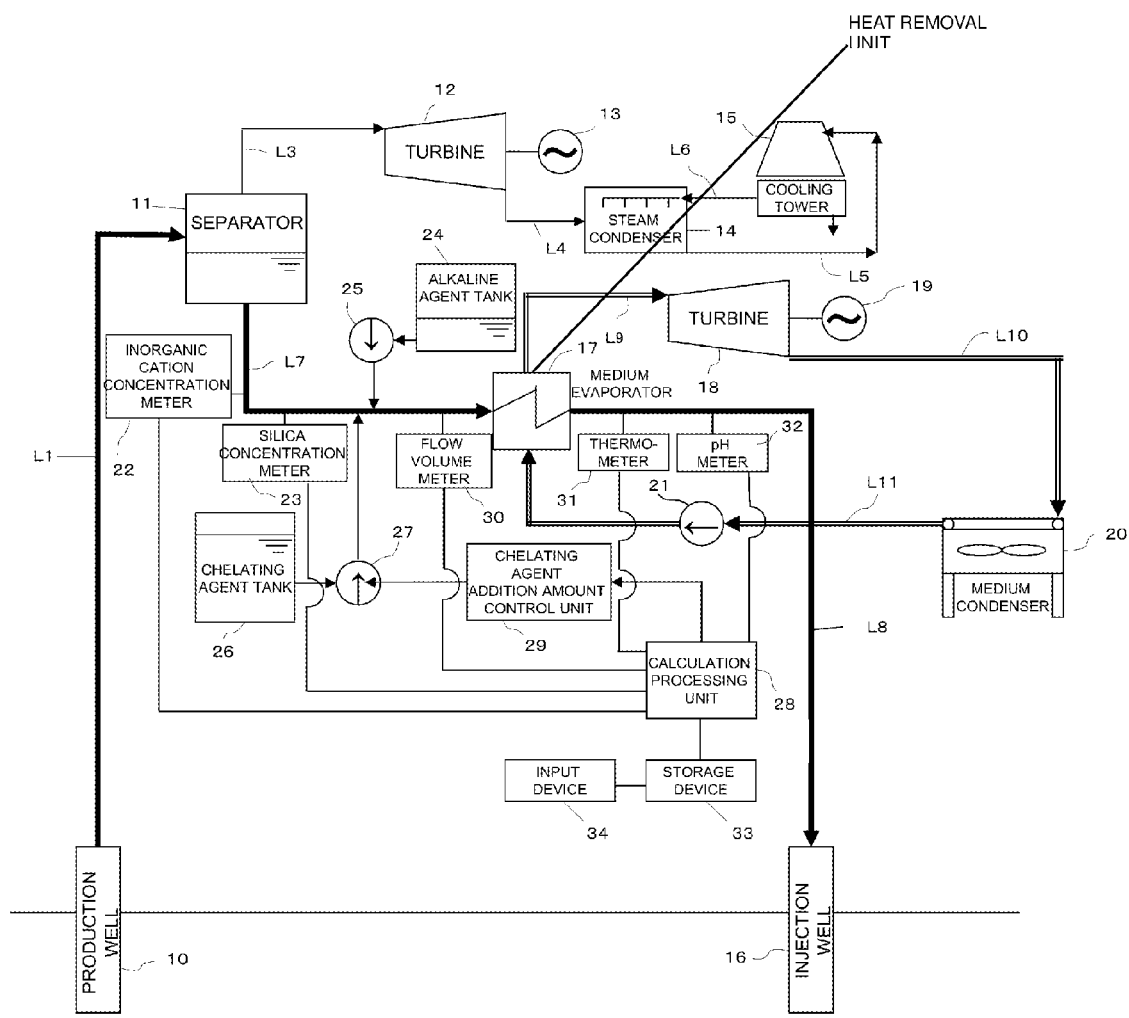
FIG. 1 is a schematic structural diagram of an embodiment of the geothermal power generation device according to the present invention.

In FIG. 1, geothermal water collected from a production well 10 is sent to a separator 11 by way of piping L1. In the separator 11, geothermal water and steam are separated, the steam is sent to a first turbine 12 via piping L3, and power is generated by a first power generator 13. The separator 11 has a flashing function for decompressing the geothermal water and extracting steam. The steam that has passed through the first turbine 12 is sent to a condenser 14 via piping L4 to become condensed water, is then sent to a cooling tower 15 via piping L5 and cooled, and is returned to an injection well 16 via a pathway that is not depicted in the drawing. A portion of the water cooled in the cooling tower 15 is returned to the condenser 14 via piping L6 and is used as water for cooling steam sent from the first turbine 12.

In this embodiment, heat is furthermore recovered from geothermal water from which steam has been separated out by the separator 11, and inorganic cations and silica are prevented from reacting and precipitating out as scale while the heat-recovered geothermal water is being returned to the injection well 16. In other words, in this embodiment, the geothermal water from which steam has been separated out by the separator 11 corresponds to the geothermal water collected from the production well in the present invention. However, in the present invention, the geothermal water collected from the production well 10 may be directly supplied to a medium evaporator 17 described hereinbelow.

A geothermal power generation device provided with this medium evaporator generates binary power using the heat of geothermal water separated in the separator 11. In other words, the geothermal water separated out in the separator 11 is sent to the medium evaporator 17 via piping L7, is made to undergo heat exchange to cause a heat medium having a low-boiling point to evaporate, and is thereafter returned to the injection well 16 via piping L8. In this embodiment, the medium evaporator 17 corresponds to the heat removal unit in the present invention.

The geothermal water vaporized in the medium evaporator 17 is sent to a second turbine 18 via piping L9, and power is generated by a second power generator 19. The geothermal water which has passed through the second turbine 18 is sent to a medium condenser 20 via piping L10 to become a condensate in the medium condenser, and is then returned to the medium evaporator 17 via piping L11 having a pump 21 at an intermediate point.

A low-boiling heat medium capable of being vaporized using the heat from the geothermal water separated in the separator 11 is used as the heat medium in this binary power generation. The heat medium is not particularly limited; examples that may be advantageously used include N-heptane, isoheptane, N-pentane, isopentane, N-butane, isobutane, hydrofluoroether, R245fa, R134a, R22, and R407c.

As described above, the geothermal water separated in the separator 11 passes through the medium evaporator 17, and heat is recovered from the geothermal water, which is then returned to the injection well 16; however, the temperature is reduced in this process, scale having silica as a main component is generated, and piping is blocked. In contrast, as described above, it is possible that the solubility of amorphous silica is increased by adding an alkaline agent to make the geothermal water alkaline, but when the geothermal water is made alkaline, bivalent or more inorganic cations and silica form salts that readily precipitate out.

In view of the above, in the present invention, a scale-inhibiting agent is added in accordance with the concentration of bivalent or more inorganic cations contained in the geothermal water, and the occurrence of scale produced by salts of the inorganic cations and silica is inhibited.

In the present invention, the bivalent or more inorganic cation is not particularly limited; examples include one or more species selected from magnesium ions, calcium ions, bivalent iron ions, trivalent iron ions, and aluminum ions. Examples of the scale-inhibiting agent include EDTA, nitrilotriacetic acid (NTA), 3-hydroxy-2-2'-iminodisuccinic acid (HIDS), carboxymethylethyleneimine, citric acid, tartaric acid, and various sodium salts, potassium salts, and ammonium salts, hydrates thereof and other chelating agents, and polyacrylic acid Na (PAS).

The configuration of the device for implementing the method for inhibiting scale as described above will be described with reference to FIG. 1. An inorganic cation concentration meter 22 and a silica concentration meter 23 are connected to the piping L7 that extends from the separator 11 to the medium evaporator 17. An alkaline agent in an alkaline agent tank 24 flows into the piping on the downstream side of the silica concentration meter via a pump 25, and a chelating agent in a chelating agent tank 26 flows into the piping in substantially the same location via a pump 27. The location where the alkaline agent flows into the piping is preferably the same location where the chelating agent flows into the piping or further to the downstream side than the location where the chelating agent flows into the piping.

The addition amount of alkaline agent supplied from the alkaline agent tank 24 preferably adjusts in order to make the pH of the geothermal water to 9 or higher, and more preferably 9.5 to 10.0.

A chelating agent addition amount control unit 29 receives a signal from the calculation processing unit 28 and controls the pump 27 to adjust the addition amount of the chelating agent.

A flow rate meter 30 is connected to a location further downstream of the location where the alkaline agent flows into the piping L7, and the flow rate of the geothermal water that flows into the medium evaporator 17 can be measured. The location where the flow rate meter 30 is installed is not limited to the location described above; the location may be further upstream than the location where the alkaline and chelating agent is added.

A thermometer 31 and a pH meter 32 are connected to the piping L8 which couples the medium evaporator 17 and the injection well 16, and the temperature and pH of the geothermal water returned to the injection well via the medium evaporator 17 are measured. The inorganic cation concentration meter 22, the silica concentration meter 23, the flow rate meter 30, the thermometer 31, and the pH meter 32 are each connected to the calculation processing unit 28. A storage device 33 is connected to the calculation processing unit 28, and an input device 34 is connected to the storage device 33.

Figure 2:
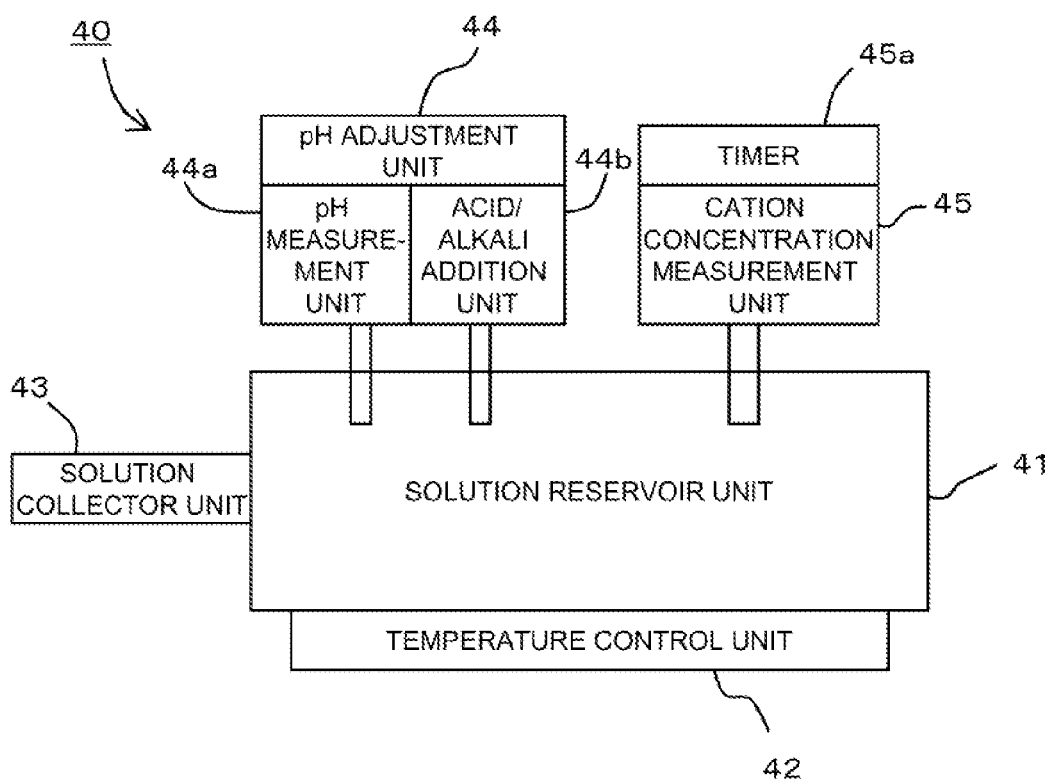
FIG. 2 is a schematic structural diagram of an example of the inorganic cation saturation concentration measurement device used in the present invention.

FIG. 2 shows an example of the inorganic cation saturation concentration measurement device advantageously used in the present invention. The inorganic cation saturation concentration measurement device 40 has a solution reservoir unit 41, and connected to this solution reservoir unit 41 are a temperature control unit 42, a solution collector unit 43, a pH adjustment unit 44, and a cation concentration measurement unit 45. To the pH adjustment unit 44A, a pH measurement unit 44a and an acid/alkali addition unit 44b are provided. A timer 45a is mounted on the cation concentration measurement unit 45.

Figure 3:
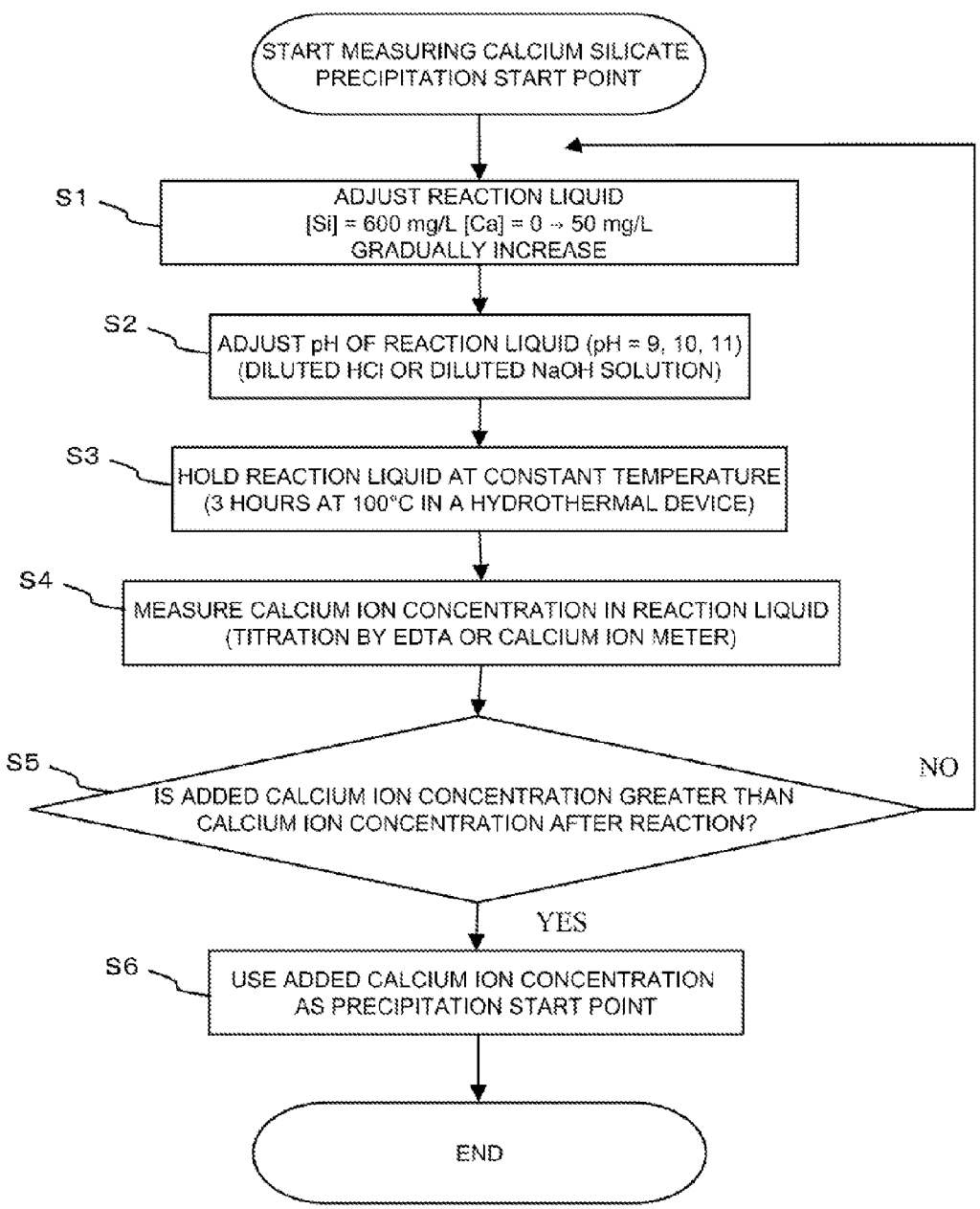
FIG. 3 is a flowchart of an example of the method for measuring the saturation concentration of inorganic cations in the present invention.

FIG. 3 shows a flowchart for measuring the saturation concentration of inorganic cations using the saturation concentration measurement device 40. In this embodiment, calcium ions are selected as the inorganic cations, and the starting point (saturation concentration) at which calcium silicate begins to precipitate is obtained.

In other words, first, a reaction liquid is adjusted so that the silica concentration is 600 mg/L and the calcium concentration is gradually increased to a range of 0 to 50 mg/L. The reaction liquid is passed via the solution collector unit 43 and filled into the solution reservoir unit 41 (step S1).

Next, a solution of, e.g., hydrochloric acid or sodium hydroxide is added from the acid/alkali addition unit 44b while the pH is measured by the pH measurement unit 44a in the pH adjustment unit 44, and the reaction liquid is adjusted to a predetermined pH, e.g., pH 9, 10, or 11 (step S2)

The reaction liquid thus adjusted to a predetermined calcium concentration and pH is held under predetermined conditions; in this embodiment, a constant temperature of 100° C. for three hours (step S3). These conditions are preferably set so as to be the same temperature and time as when the geothermal water is returned to the injection well 16 by way of the medium evaporator 17.

Next, after a predetermined length of time (three hours in this embodiment) has elapsed as measured by the timer 45a, the cation concentration (the calcium concentration in this embodiment) is measured by the cation concentration measurement unit 45 (step S4). The calcium concentration can be measured by, e.g., EDTA titration or a calcium ion meter.

It is determined whether the concentration of initially added calcium ions is higher than the calcium ion concentration after the reaction (step S5). If NO, the process returns to step S1. If YES, it is determined (step S6) that the calcium ion concentration (the concentration in step S1) of the water sample at this point is the starting point of precipitation (the saturation concentration in the present invention), and the process is ended.

There is no limitation to the calcium; in the case of, e.g., magnesium, the reaction liquid in which the magnesium concentration has been gradually increased in step S1 can be adjusted and measured in the same manner.

Figure 4:
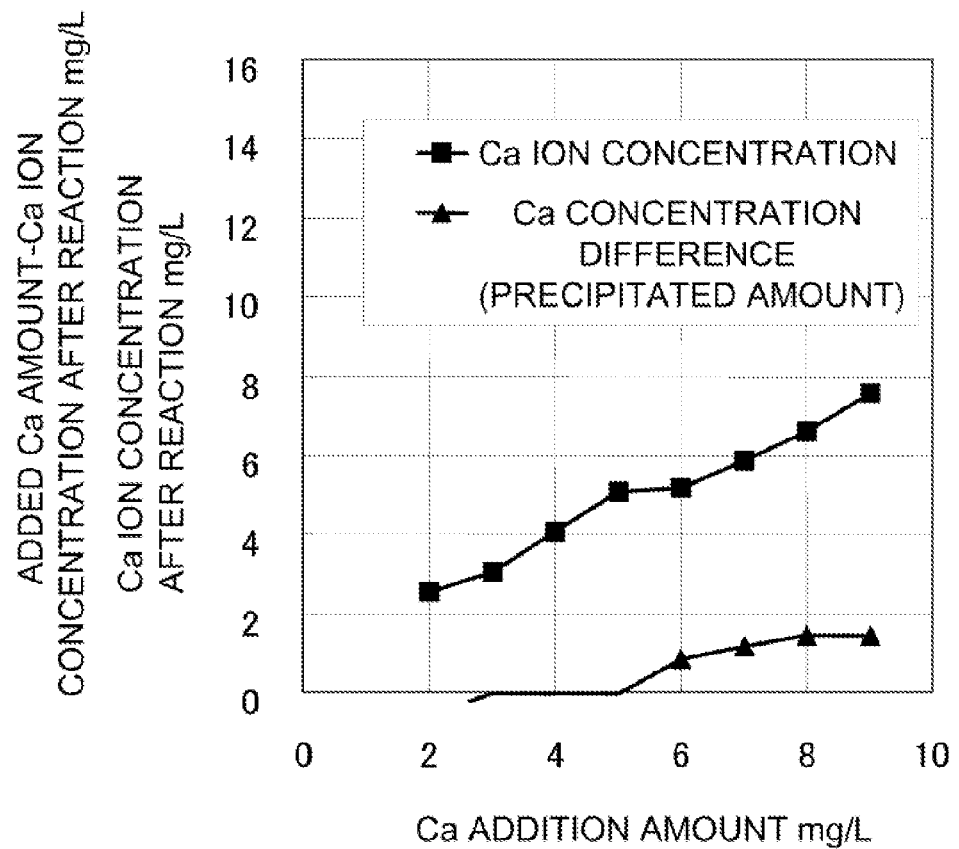
FIG. 4 is a chart showing the results of measuring the saturation concentration of calcium ions in specific conditions using the method of the present invention.

FIG. 4 shows the results of measuring the saturation concentration of calcium at pH 9 using the above-described method. The horizontal axis of the chart shows the calcium addition amount (mg/L) when the reaction liquid is adjusted. The vertical axis shows the calcium ion concentration (mg/L, the black squares on the graph) after the reaction, and shows the value (mg/L, the black triangles on the graph) obtained by subtracting the calcium ion concentration after the reaction from the corresponding amount of calcium added. Therefore, the saturation concentration of the calcium ions for the case in which treatment has been carried out for 3 hours at 100° C. at a pH of 9 with the silica concentration set to 600 mg/L is 5 mg/L, which is the calcium addition amount, at which the value obtained by subtracting the calcium ion concentration after the reaction from the calcium addition amount then converts to a positive value.

Figure 5:
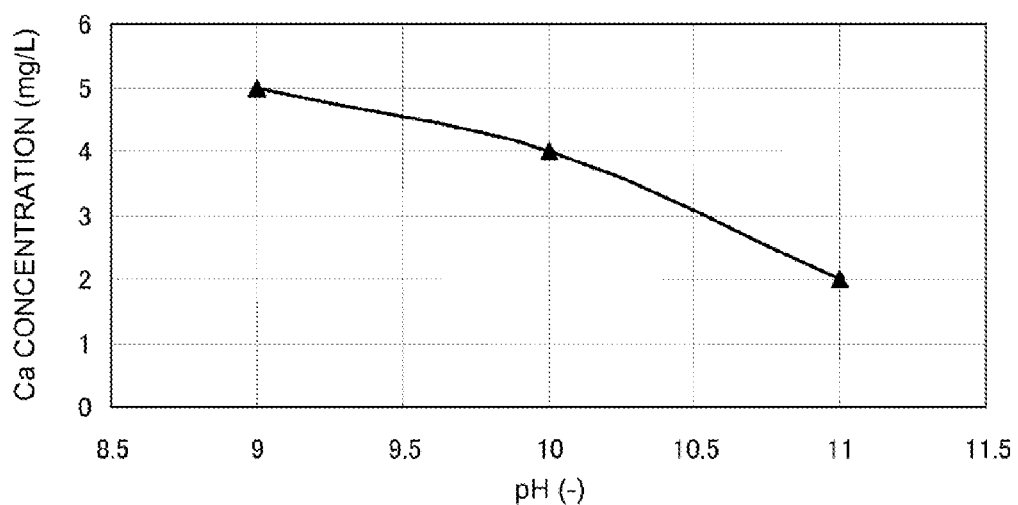
FIG. 5 is a chart showing the relationship between the solution pH and the saturation concentration of calcium silicate.

FIG. 5 shows the result of repeating the measurement shown in FIG. 3 under various pH conditions, and measuring the calcium saturation concentration at each pH. It is apparent that the calcium saturation concentration is reduced as the pH is increased in this manner.

Data obtained by varying the pH and taking measurements is obtained in advance for the saturation concentration of inorganic cations in the case that treatment is carried out under predetermined conditions that have been set so that the temperature and time are the same as the conditions when the geothermal water is returned to the injection well 16 via the medium evaporator 17. The data is inputted from the input device 34 in FIG. 1 and stored in the storage device 33. In the case that the temperature and time fluctuate, the data is obtained under various conditions.

Figure 6:
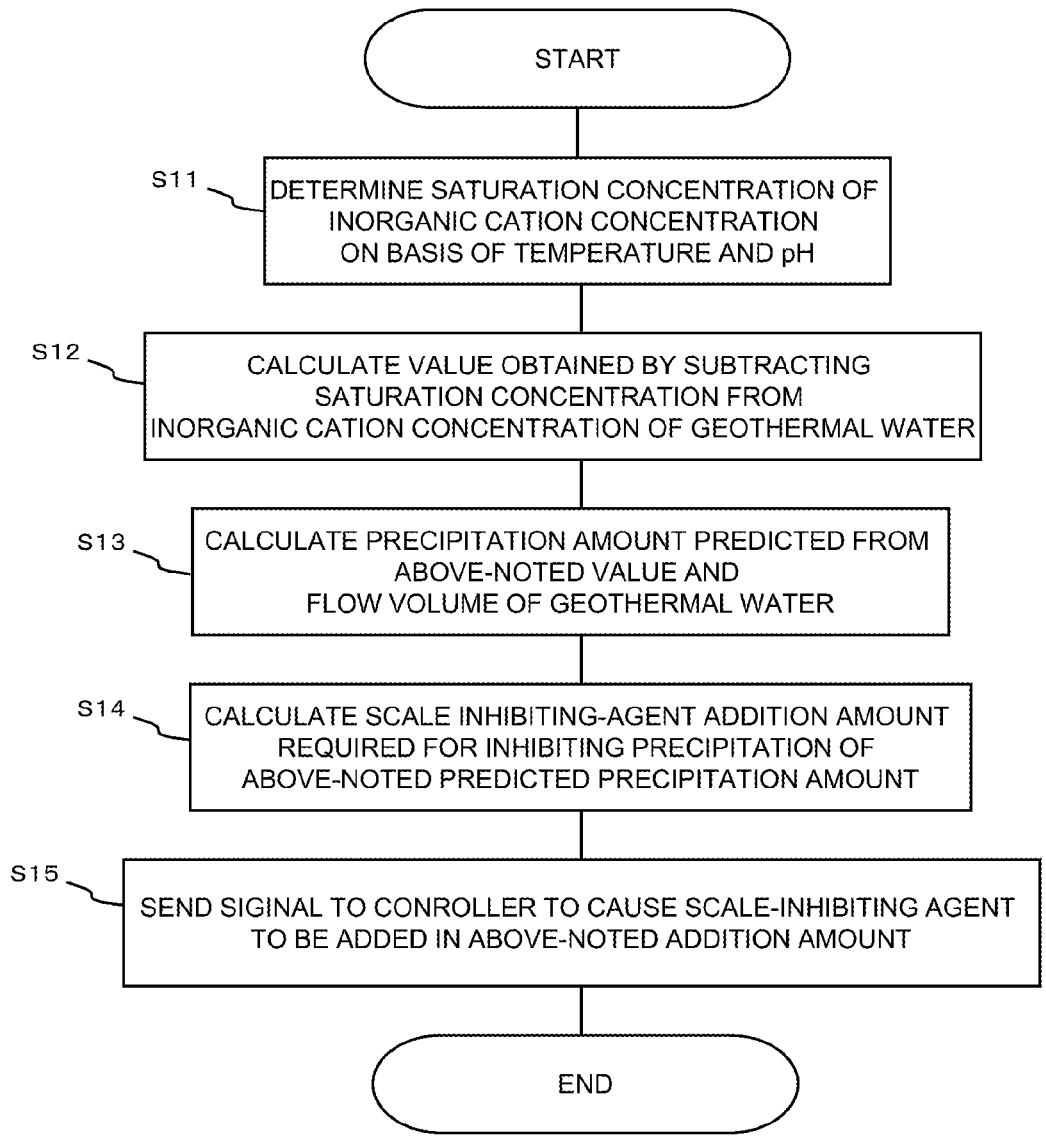
FIG. 6 is a chart showing the steps for adding a scale-inhibiting agent in an embodiment of the present invention.

Described next with reference to FIG. 6 is the procedure by which the addition amount of the chelating agent, which is a scale-inhibiting agent, is obtained in the calculation processing unit 28 of FIG. 1, by which the pump 27 is controlled by the chelating agent addition amount control unit 29, and by which a predetermined amount of the chelating agent is added.

First, the saturation concentration of inorganic cations in the geothermal water under the measured conditions is determined from the saturation concentration data of the inorganic cations under various conditions as stored in the storage device 33, on the basis of the temperature measured by the thermometer 31 and the pH measured by the pH meter 32 (step S11).

Calculated next is the value obtained by subtracting the saturation concentration thus determined from the inorganic cation concentration of the geothermal water as measured by the inorganic cation concentration meter 22 (step S12). Here, in the case that the geothermal water is made to evaporate by the separator 11 to obtain steam, the concentration factor is estimated from the amount of steam, and the concentration thus estimated is used as the inorganic cation concentration of the geothermal water because the inorganic cation concentration in the geothermal water will increase.

Next, the amount of inorganic cations predicted to precipitate out in the case that a scale-inhibiting agent (chelating agent) is not added is calculated from the flow rate of the geothermal water measured by the flow rate meter 30 and from the value obtained by subtracting the saturation concentration from the inorganic cation concentration in the geothermal water (step S13).

Next, the addition amount of the scale-inhibiting agent (chelating agent) is calculated in order to inhibit precipitation of inorganic cations in the amount predicted to precipitate (step S14).

Last, a signal is sent to the chelating agent addition amount control unit 29, the pump 27 is operated so as to achieve the addition amount thus obtained, the scale-inhibiting agent is added (step S15), and the routine is ended.

The operation in FIG. 6 performed by the calculation processing unit 28 is carried out at, e.g., predetermined intervals, and a suitable amount of precipitation-inhibiting agent is constantly added to the geothermal water.

In this manner, power is generated in the first power generator 13 using the first turbine 12, power is generated in the second power generator 19 using the second turbine 18, and the heat energy of geothermal water can be effectively used to generate power while the geothermal water is prevented from precipitating scale in the piping. Also, economic operation is made possible because the amount of the scale precipitation-inhibiting agent (chelating agent) to be added can be kept to a required minimum.

EXPLANATION OF NUMERALS AND CHARACTERS

10 Production well
11 Separator
12 First turbine
13 First generator
17 Medium evaporator
18 Second turbine
19 Second generator
20 Medium condenser
21 Pump
22 Inorganic cation concentration meter
23 Silica concentration meter
24 Alkaline agent tank
25 Pump
26 Chelating agent tank
27 Pump
28 Calculation processing unit
29 Chelating agent addition amount control unit
30 Flow rate meter
31 Thermometer
32 pH meter
33 Storage device
34 Input device
40 Saturation concentration measurement device
41 Solution reservoir unit
42 Temperature control unit
43 Solution collector unit
44 pH adjustment unit
44a pH measurement unit
44b Acid/alkali addition unit
45 Cation concentration measurement unit
45a Timer

The invention claimed is:

1. A method for inhibiting scale comprising:
  (a) measuring a flow volume and a concentration of calcium cations in geothermal water collected from a production well;
  (b) removing heat from the geothermal water;
  (c) measuring a temperature and measuring a pH of the geothermal water after the heat removal step (b);
  (d) determining a saturation concentration of the calcium cations at the measured temperature and the measured pH from a set of pre-obtained data on the basis of said measured temperature and said measured pH of the geothermal water after the heat removal step (b), and determining an addition amount of a scale-inhibiting agent for inhibiting the precipitation of salts containing the calcium cations on the basis of the flow volume of the geothermal water and a value obtained by subtracting the saturation concentration from the calcium cation concentration measured in step (a); and (e) adding the scale-inhibiting agent to the geothermal water collected from the production well at the addition amount of the scale-inhibiting agent determined in step (d).

2. The method for inhibiting scale according to claim 1, wherein the pH of the geothermal water is adjusted to 9 or higher.

3. The method for inhibiting scale according to claim 2, which further comprises adding an alkaline agent at the same time the scale-inhibiting agent is added to the geothermal water or after the scale-inhibiting agent has been added to the geothermal water to adjust the pH to 9 or higher.

4. The method for inhibiting scale according to claim 1, wherein the heat removal step (b) includes a flashing step for decompressing the geothermal water and extracting steam, and/or recovering heat from the geothermal water to cause a power-generating medium to evaporate.

5. The method for inhibiting scale according to claim 1, which further comprises subjecting the geothermal water collected from the production well to a gas-liquid separation, wherein steam obtained after the gas-liquid separation is fed to a power generation facility, and the geothermal water after the gas-liquid separation is sent to the heat removal step (b).

* * * * *